June 9, 1964 J. D. THOMPSON 3,136,661
APPLICATOR APPARATUS FOR DEPOSITING
DISSOLVED PLASTIC RIBBONS
Filed March 7, 1957

INVENTOR.
JAY D. THOMPSON
BY
Williamson, Schroeder, Adams & Meyers
ATTORNEYS

United States Patent Office 3,136,661
Patented June 9, 1964

3,136,661
APPLICATOR APPARATUS FOR DEPOSITING
DISSOLVED PLASTIC RIBBONS
Jay D. Thompson, St. Paul, Minn., assignor to G. T.
Schjeldahl Company, Northfield, Minn., a corporation
of Minnesota
Filed Mar. 7, 1957, Ser. No. 644,502
1 Claim. (Cl. 118—415)

This invention relates to the manufacture of plastic tape and more particularly to applicator apparatus for depositing and forming a fluid ribbon of plastic material dissolved in a highly volatile solvent.

The particular form of tape which is deposited and dried from solution is desirable in the plastic heat sealing art. In many applications, it is desired to insert a strip of thermoplastic tape material between two thermoplastic sheets, following which the sheets and tape are heated to form a united seal. A plastic sealing tape of the type desired cannot generally be cut from large sheets of thermoplastic material since the preformed sheet has oriented molecular fiber structure inherently produced during its formation. Working of the plastic material produces local variation in melting point and in strength of the material. For the same reason, it is not feasible to produce the sealing tape from molten plastic material which is extruded from a nozzle and, furthermore, it is very difficult to produce a uniform product. The sealing tape contemplated in this inveniton should be quite uniform in both width and thickness and must be virtually free of bubbles and flaws. The melting point should be uniform and lower than that of the sheet through which sealing heat is transferred lest the sheet to be sealed is itself weakened or ruptured.

If a solvent with low volatility can be provided for the thermoplastic material under consideration, there is no great problem in casting a ribbon of viscous solvent upon a belt or other moving surface to produce the type of tape desired. There is, however, another problem introduced when the tape is cast from a solution containing a low volatile solvent, and that is the difficulty with which the solvent is ultimately removed from the tape. In some instances, the minutest traces of residual solvent will completely change the physical properties of the tape and may leave it in such sticky condition that it is impossible to use as a heat sealable tape between sheet laminations as above described.

It is our belief that the best type of thermoplastic tape with randomly oriented fiber structure can best be formed from a solution made with a highly volatile solvent. A new problem is introduced, however, in attempting to cast such tape from a highly volatile solution. When prior art devices such as roller applicators, nozzles, wipers, resilient spreaders and so forth are employed, the solution rapidly dries at certain areas of the applicator and gobs of plastic material rapidly build up. The quality of the tape formed is soon impaired and, in a short while, it becomes virtually impossible to continue making the tape until the equipment is dismantled and thoroughly cleaned.

It is within the contemplation of this invention and an important object thereof to provide apparatus which will efficiently deposit, on a relatively moving surface, a ribbon of fluid containing a solid dissolved in a highly volatile solvent, without permitting gumming or plugging of the apparatus employed.

Another object of the invention is to provide an applicator tool for highly volatile solutions, which tool has structural features which maintain all of the solution constantly moving in a tape-forming operation so as to prevent slowing down and ultimate drying-out of the solution on any area of the tool which will interfere with the quality and control of the tape to be cast.

It is a further object of the invention to provide an applicator apparatus wherein a flexible moving belt is capable of adjustment in sliding contact with film depositing means so that the thickness of the deposited film can be changed at will without varying the design of the depositing means.

These and other objects and advantages of my invention will more fully appear from the following description made in connection with the accompanying drawing, wherein like reference characters refer to the same parts throughout the several views and in which.

Figure 4:
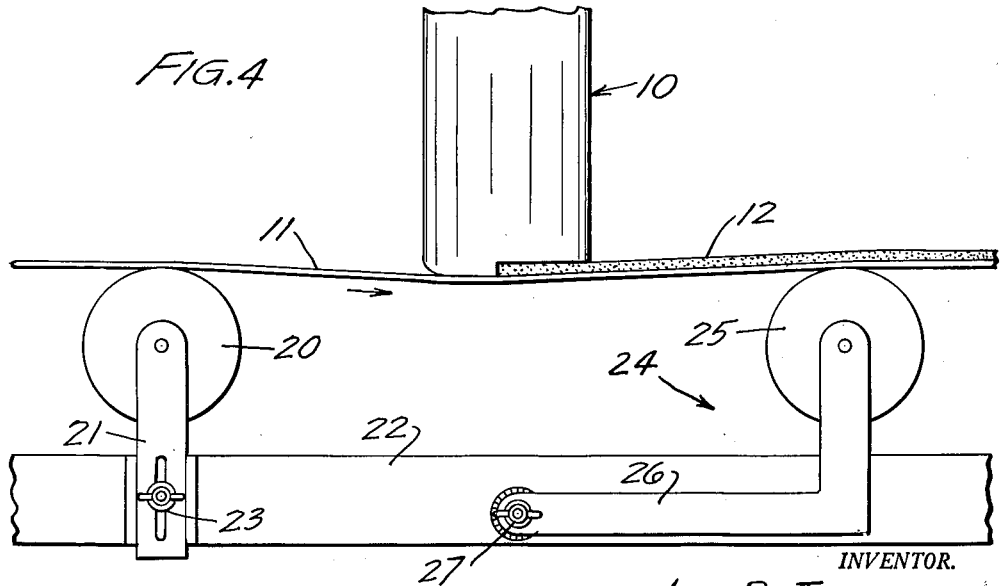
FIGURE 4 is a diagrammatic representation of the applicator tool in the process of depositing a fluid ribbon on a flexible belt supported on roller and guide means.

With continued reference to the drawing, my applicator apparatus comprehends generally an applicator tool 10 and a relatively moving surface such as flexible belt 11, as shown in FIGURE 4. When the flexible belt 11 moves in contact with the applicator tool 10, a ribbon of solution 12 is cast upon the belt from a source of supply (not shown), but feeding with constant head into the applicator tool.

My special applicator tool comprises a fluid conduit 13 which may be tubular and having a circular cross section as shown in the instant disclosure. The fluid conduit 13 is intended to be utilized in depending relation with respect to the source of solution, and overlies the relatively moving surface 11, as shown in FIGURE 4. The applicator tool may be made of any material which will not be attacked by the solution used therewith and, in addition, it is preferred that the material of construction be of a nature not easily wet by the solvent component of the solution unless maintained in direct contact therewith. The desired characteristic just mentioned is to discourage the solution from creeping outwardly to adjacent areas of the tool where the solution may become static and thereby dry out with resultant depositing of plastic material. In a specific example, where I dissolve a co-polymer of polyethylene terephthalate in methylene dichloride, I have found that Teflon is a long-lasting and desirable material of construction for the applicator tool.

Figure 1:
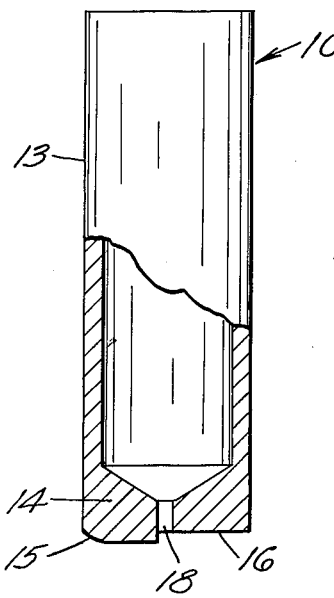
FIGURE 1 is a side elevation of my applicator tool, the lower portion thereof being cut away in vertical section.
Figure 3:
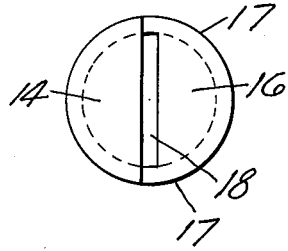
FIGURE 3 is a bottom view of the applicator tool shown in FIGURE 1.
Figure 2:
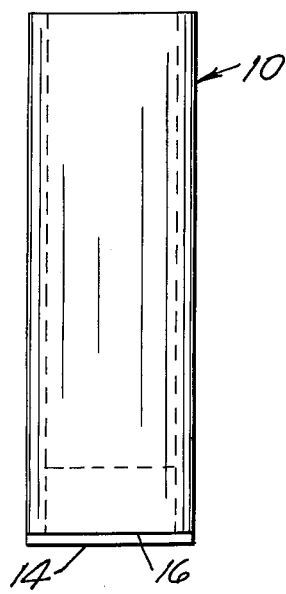
FIGURE 2 is a rear view of the applicator tool taken from the right in FIGURE 1.

The applicator tool or head has formed at the lower terminus thereof a shoe 14, as shown in FIGURES 1, 2 and 3, which may be substantially flat and horizontal with a slight forward curvature at 15, as shown in FIGURE 1. Where the applicator tool or head has a fluid conduit 13 of substantially circular cross section adjacent the lower end, the shoe 14 may form a partial closure therefor and may be of substantially semi-circular configuration as shown. The shoe 14 is intended to be kept dry at all times and to lie in sliding engagement with relatively moving surface 11, when a fluid ribbon is cast from the applicator tool.

Also forming a part of the applicator head in upwardly offset relation with respect to the shoe 14 is the stepped area 16, as shown in FIGURES 1, 2 and 3. The stepped area 16 may also provide partial closure for the tubular fluid conduit 13, being of semi-circular configuration and located rearwardly of the shoe 14 with respect to the relative direction of travel of the applicator tool in its operative contact with the moving surface 11. The stepped area 16 has well-defined sharp edges 17 at each side of the applicator tool which determine the width of the fluid ribbon 12 when it is deposited on the flexible moving belt 11.

A slotted orifice 18 is disposed just rearwardly of the shoe 14 and in a forward position relative to the stepped area 16. The slotted orifice is diametrically arranged, as shown in FIGURE 3, and extends laterally to the direction of relative travel of the applicator tool with respect to flexible belt 11. The slotted orifice 18 has a uniform gap throughout its width which also favors uniform flow of solution during use. The height of the step between the shoe 14 and the stepped area 16 is of the same order as the width of the gap in the slotted orifice 18 and, in most instances, I have found that satisfactory results can be obtained where the step is slightly less than the width of the orifice gap.

The flexible belt which supplies my relatively moving surface is shown in operative contact with the applicator head or tool 10 in FIGURE 4. The flexible belt 11 may be endless in character and may be utilized in the manner disclosed in the co-pending application of my assignee, G. T. Schjeldahl Company, Serial Number 623,221, and entitled "Method and Machine for Making Heat-Sealable Tape" and which application is now abandoned. I have found that the material, Teflon, also is suitable for the flexible belt 11 since the tape formed from the ribbon 12 is peelable therefrom without sticking or gumming. The flexible belt 11 is caused to travel in the direction of the arrow in FIGURE 4, and may be tensioned by conventional means, not shown. In addition, however, I prefer to supply a tensioning roller 20 which supports belt 11 forwardly of the applicator tool 10, and this roller 20 may be mounted rotatably on bracket means 21 which, in turn, is vertically adjustable with respect to frame 22, the adjustment being effected through such means as slot and clamp arrangement 23.

An important feature of my invention is the guide means 24 which may also constitute a supporting roller 25 rotatably mounted on a pivotal arm bracket 26 so as to render the supporting roller 25 vertically adjustable together with flexible belt 11. Arm bracket 26 may be pivotally and adjustably secured by the radial clamp 27 secured in turn to supporting frame 22, as shown in FIGURE 4.

In a particular commercial run, I employ the above mentioned plastic co-polymer dissolved in methylene dichloride in a ratio of 25 parts of the plastic material to 75 parts of solvent. The boiling point of methylene dichloride lies between 40 degrees and 41 degrees centigrade, and therefore is a highly volatile solvent of the type which is apt to cause gumming and accidental deposition of plastic substance on the applicator head during use. Where I produce a tape of from one-quarter inch to one-half inch in width, and of three mils thickness, the applicator tool is provided with a slot having a uniform gap of .025 inch, and the step height is .020 inch. To obtain a tape of the same three mil thickness from the same materials wherein the solids constitute from 18% to 20% of the solution, I have found that a slot gap of .020 inch may be successfully employed with a corresponding step height of .016 inch. The applicator head can be varied in its proportion of parts to quite some extent depending on the viscosity of the solution and upon the size of the tape desired. However, in each case, the step height should not exceed appreciably the width of the slot, and the dry character of the shoe should be maintained at all times with the ribbon of solution feeding cleanly from the peripheral edges of the slotted orifice and the stepped area during formation of the tape.

When the applicator tool is functioning properly, a tail of partially dried solution may form rearwardly of the stepped area, but since such formation does not interfere with the edge characteristics or the thickness of the film, it does not constitute a gumming or plugging of the tool itself. As a matter of fact, through some unexplainable phenomenon, the presence of the tail appears to assist in the control and formation of a flawless cast tape.

Without changing the character of the solution or the physical dimensions of the applicator tool, I can control to some degree the thickness of the ultimate tape through the simple expedient of adjusting guide means 24 in a vertical direction. Thus, if the roller 25 is raised slightly, a converging angle is formed between the stepped area 16 and the surface of belt 11. Such converging angle will pinch down the deposited film 12 and result in a somewhat thinner tape without affecting the quality thereof. The tape formed from the ribbon of solution 12 is largely free of solvent when the belt 11 has traveled but a short distance rearwardly of the applicator tool 10, and the production and collection of such tape is more fully described in the previously referred to co-pending application, Serial Number 623,221. It may thus be seen that, through my special applicator tool construction, and more particularly through the employment of a slotted orifice in conjunction with a leading shoe and trailing stepped area which functions as a spreading plate, the difficulty of casting a uniform and closely controlled tape from a highly volatile solution has become obviated.

It will, of course, be understood that various changes may be made in the form, details, arrangement and proportions of the parts without departing from the scope of my invention.

What I claim is:

An applicator head for depositing continuously on a relatively moving surface a film of fluid having a highly volatile constituent, said applicator head comprising, a fluid conduit of circular cross section adapted to overlie the relatively moving surface and to be supplied with a substantially constant head of fluid solution, a substantially semi-circular shoe formed at the lower terminus of the conduit and adapted to bear in dry sliding engagement with said moving surface, a substantially semi-circular upwardly stepped area located rearwardly of the shoe with respect to the relative forward direction of travel of the head and adapted to be wet with solution and to maintain a spaced clearance with respect to said moving surface, and a slotted orifice communicating with said fluid circular conduit diametrically thereof between the shoe and the stepped area substantially for the width of said conduit and disposed transversely to the direction of relative travel whereby to deliver the highly volatile solution continuously to the relatively moving surface from its contacting relation with the stepped area to define the thickness and the width of the solution cast upon the moving surface.

References Cited in the file of this patent

UNITED STATES PATENTS

| | | |
|---|---|---|
| 1,278,304 | Wood | May 17, 1921 |
| 1,494,316 | Ostenberg | May 13, 1924 |
| 1,844,972 | Parkhurst | Feb. 16, 1932 |
| 2,243,333 | Diescher | May 27, 1941 |
| 2,471,330 | Knight et al. | May 24, 1949 |
| 2,489,951 | Bump | Nov. 29, 1949 |
| 2,491,185 | Kamborian | Dec. 13, 1949 |
| 2,693,007 | Rhodes | Nov. 2, 1954 |
| 2,714,745 | Kenyon | Aug. 9, 1955 |
| 2,727,275 | Nelson | Dec. 20, 1955 |
| 2,754,544 | Bicker | July 17, 1956 |
| 2,757,099 | Speed et al. | July 31, 1956 |
| 2,761,418 | Russell | Sept. 4, 1956 |
| 2,774,327 | Saint-Hilaire | Dec. 18, 1956 |
| 2,847,709 | Sweet et al. | Aug. 19, 1958 |
| 2,920,352 | Miller et al. | Jan. 12, 1960 |
| 2,965,613 | Milone et al. | Dec. 20, 1960 |